United States Patent
Kitatomi et al.

(10) Patent No.: US 11,945,724 B2
(45) Date of Patent: Apr. 2, 2024

(54) ACTIVATED CARBON AND PRODUCTION METHOD THEREOF

(71) Applicant: KURARAY CO., LTD., Okayama (JP)

(72) Inventors: Hiroaki Kitatomi, Okayama (JP); Mitsunori Nishita, Okayama (JP); Mitsunori Hitomi, Okayama (JP); Takayuki Yamada, Okayama (JP)

(73) Assignee: KURARAY CO., LTD., Kurashiki (JP)

( * ) Notice: Subject to any disclaimer, the term of this patent is extended or adjusted under 35 U.S.C. 154(b) by 791 days.

(21) Appl. No.: 16/955,828

(22) PCT Filed: Dec. 14, 2018

(86) PCT No.: PCT/JP2018/046069
§ 371 (c)(1),
(2) Date: Jun. 19, 2020

(87) PCT Pub. No.: WO2019/131209
PCT Pub. Date: Jul. 4, 2019

(65) Prior Publication Data
US 2020/0331763 A1 Oct. 22, 2020

(30) Foreign Application Priority Data

Dec. 27, 2017 (JP) ................. 2017-252399

(51) Int. Cl.
*C01B 32/30* (2017.01)
*C01B 32/318* (2017.01)
*C01B 32/336* (2017.01)

(52) U.S. Cl.
CPC ............ *C01B 32/318* (2017.08); *C01B 32/30* (2017.08); *C01B 32/336* (2017.08); *C01P 2006/12* (2013.01); *C01P 2006/14* (2013.01); *C01P 2006/16* (2013.01); *C01P 2006/17* (2013.01)

(58) Field of Classification Search
CPC .............. C01B 32/30; C01P 2006/17
See application file for complete search history.

(56) References Cited

U.S. PATENT DOCUMENTS

| 5,370,794 A * | 12/1994 | Obayashi ................. B01J 20/20 |
| | | 210/656 |
| 11,707,727 B2 * | 7/2023 | Yamanoi ................... C02F 1/28 |
| | | 502/426 |
| 2010/0069507 A1 * | 3/2010 | Tabata .................. C01B 32/336 |
| | | 502/437 |
| 2015/0064256 A1 | 3/2015 | Howell et al. |
| 2015/0375197 A1 | 12/2015 | Yanagi et al. |
| 2017/0209848 A1 | 7/2017 | Takenaka et al. |
| 2019/0022624 A1 | 1/2019 | Yamanoi et al. |

FOREIGN PATENT DOCUMENTS

| CN | 103547364 A | 1/2014 |
| CN | 104692378 A | 6/2015 |
| EP | 2960206 A1 | 12/2015 |
| JP | 8-40713 A | 2/1996 |
| JP | 2006104002 A | 4/2006 |
| JP | 2015516373 A | 6/2015 |
| JP | 2016030697 A | 3/2016 |
| JP | 2017171538 A | 9/2017 |
| WO | WO-2017146044 A1 | 8/2017 |

OTHER PUBLICATIONS

Extended European Search Report dated Jun. 1, 2021 in Patent Application No. 18893544.9, 8 pages.
English Translation of the International Preliminary Report on Patentability and Written Opinion dated Jul. 9, 2020 in PCT/JP2018/046069, 8 pages.
International Search Report dated Mar. 5, 2019 in PCT/JP2018/046069, 2 pages.

* cited by examiner

*Primary Examiner* — Stuart L Hendrickson
(74) *Attorney, Agent, or Firm* — Element IP, PLC.

(57) ABSTRACT

Disclosed herein are activated carbons having a high decolorization performance in a liquid phase, and methods for producing the activated carbons. Disclosed herein are also activated carbons having a high decolorization performance in liquid phases having relatively high viscosities, such as sugar liquids, and methods for producing the activated carbons. Activated carbons disclosed herein include activated carbons having a pore volume, which is calculated by measuring a nitrogen adsorption isotherm at 77 K and performing the MP method analysis, of 0.58 mL/g or less, and having a pore volume at a pore diameter of 10 to 10000 nm measured by the mercury intrusion method of 0.35 mL/g or more.

16 Claims, No Drawings

ACTIVATED CARBON AND PRODUCTION METHOD THEREOF

TECHNICAL FIELD

The present invention relates to activated carbon and a method for producing the same.

BACKGROUND ART

Activated carbon has an excellent adsorption ability, and is widely used in a liquid phase treatment such as a removal of impurities from a liquid phase or an adjustment of a concentration of a dissolved component in a liquid phase.

An adsorption ability of activated carbon in a liquid phase treatment extensively depends on whether the properties of the used activated carbon itself such as a pore volume and a pore distribution adapt to the properties of an adsorptive substance to be treated.

For example, D1 discloses activated carbon for decolorization which has developed pores at macropore ranges of 200 to 1000 nm and 600 to 1000 nm, and discloses that this activated carbon is produced by mixing and grounding two kinds of coal-based carbonaceous materials, pressure-forming the obtained mixture powder, crushing the pressure-formed product, subjecting the crushed product to a heating treatment, and then, activating the treated product.

PRIOR ART DOCUMENTS

Patent Documents

Patent Document 1: JP-A-2006-104002

SUMMARY OF THE INVENTION

Problems to be Solved by the Invention

However, regarding the activated carbon obtained in Patent Document 1, higher performances (for example, a higher sugar liquid decolorization performance, and the like) may be required from a viewpoint of a practical use.

The present invention was performed in view of the above circumstances, and a problem of the present invention is to provide activated carbon having a high decolorization performance in a liquid phase, and a method for producing the same. In addition, a problem of the present invention is to provide activated carbon having a high decolorization performance in a liquid phase having a relatively high viscosity, such as a sugar liquid, and a method for producing the same.

Solutions to the Problems

The present inventors have found importance of developing the specified pore volumes of the pores including mesopores to macropores for an improved decolorization performance of the activated carbon, and arrived at the present invention, as a result of intensive studies to solve the above problems.

The present invention includes the following preferred embodiments.

[1] Activated carbon, wherein the activated carbon has a pore volume, which is calculated by measuring a nitrogen adsorption isotherm at 77 K and performing the MP method analysis, of 0.58 ml/g or less, and a pore volume at a pore diameter of 10 to 10000 nm measured by the mercury intrusion method of 0.35 mL/g or more.

[2] The activated carbon according to the above [1], wherein a ratio of a pore volume at a pore diameter of 10 to 50 nm of the activated carbon is 28% or more in the pore volume at a pore diameter of 10 to 10000 nm measured by the mercury intrusion method.

[3] The activated carbon according to the above [1] or [2], wherein a ratio of a pore volume at a pore diameter of 1000 to 10000 nm of the activated carbon is 19% or less in the pore volume at a pore diameter of 10 to 10000 nm measured by the mercury intrusion method.

[4] The activated carbon according to any one of the above [1] to [3], wherein a ratio of a pore volume at a pore diameter of 10 to 30 nm of the activated carbon is 30% or more in a pore volume at a pore diameter of 2 to 30 nm calculated by measuring a nitrogen adsorption isotherm at 77 K and performing the CI method analysis.

[5] The activated carbon according to any one of the above [1] to [4], wherein a raw material of the said activated carbon is activated carbon derived from a coal.

[6] The activated carbon according to any one of the above [1] to [5], wherein the said activated carbon is activated carbon for a liquid phase treatment.

[7] A method for producing the activated carbon according to any one of the above [1] to [6], comprising: a step of adjusting a potassium element content of raw material activated carbon to 0.5% by mass or less, a step of adjusting a calcium element content of raw material activated carbon to 0.4 to 4% by mass, and a step of activating the raw material activated carbon after the adjustment steps.

Effects of the Invention

According to the present invention, activated carbon having a high decolorization performance in a liquid phase, and a method for producing the same can be provided. In addition, activated carbon having a high decolorization performance especially in a liquid phase having a relatively high viscosity, such as a sugar liquid, and a method for producing the same can be provided.

EMBODIMENTS OF THE INVENTION

Hereinafter, embodiments of the present invention are explained. However, the scope of the present invention is not limited to the embodiments explained below, and various modifications can be made within a range that does not impair the purpose of the present invention.

Activated Carbon

The activated carbon of the present invention has a pore volume, which is calculated by measuring a nitrogen adsorption isotherm at 77 K and performing the MP method analysis, of 0.58 mL/g or less, and a pore volume at a pore diameter of 10 to 10000 nm measured by the mercury intrusion method of 0.35 mL/g or more.

The pore volume calculated by measuring a nitrogen adsorption isotherm at 77 K and performing the MP method analysis (hereinafter, it is also referred to as "a MP pore volume") is a pore volume of a micropore. The micropore is a pore mainly involved in an adsorption of a substance having a small molecular weight such as a gas component, and does not participate much in an adsorption of a coloring substance and the like. Therefore, activated carbon in which only the MP pore volume has been developed is likely to be unsuitable for decolorization applications. Activated carbon having a developed MP pore volume above 0.58 mL/g does not have the desired decolorization performance, since it has relatively small pore volumes of a mesopore or a pore having a pore diameter larger than that of the mesopore which are mainly involved in an adsorption of a coloring substance and the like. The said MP pore volume is preferably 0.50 mL/g or less, more preferably 0.40 mL/g or less. When the MP pore volume is the above value or less, the desired decolorization performance can be obtained more readily. The lower limit of the MP pore volume is not especially limited, but is usually 0.2 mL/g. The said MP pore volume can be measured by the method described in the Examples mentioned below.

The specified pore volume mentioned above can be adjusted by adjusting a potassium element content of raw material activated carbon to 0.5% by mass or less, adjusting a calcium element content of raw material activated carbon to 0.4 to 4 by mass or less, and activating the raw material activated carbon after the adjustments, as described later. An activation yield should be appropriately selected so as to obtain the specified pore volume.

The pore at a pore diameter of 10 to 10000 nm serves not only as an adsorbed site, but also as a moving path of a substance to a smaller pore. Therefore, when the pore volume at a pore diameter of 10 to 10000 nm is less than 0.35 mL/g, a movement of an adsorptive substance into the activated carbon inside is prevented, and thus, the desired decolorization performance or decolorization arrival rate cannot be obtained. The pore volume at a pore diameter of 10 to 10000 nm is preferably 0.4 mL/g or more, more preferably 0.6 mL/g or more, especially preferably 1.0 mL/g or more. The upper limit of the pore volume at a pore diameter of 10 to 10000 nm is usually 1.9 mL/g from viewpoints of deterioration of a decolorization performance due to deterioration of a packing density and deterioration of hardness. The pore volume at a pore diameter of 10 to 10000 nm by the mercury intrusion method can be measured by the method described in the Examples mentioned below.

In the activated carbon of the present invention, a ratio of a pore volume at a pore diameter of 10 to 50 nm is preferably 28% or more, more preferably 33% or more, especially preferably 35% or more, in the pore volume at a pore diameter of 10 to 10000 nm measured by the mercury intrusion method. The pore having a pore diameter of 10 to 50 nm serves as an adsorbed site. Therefore, when the above ratio is the above value or more, the desired decolorization performance can be obtained more readily. The upper limit of the above ratio is not especially limited, but is usually 80%.

In the activated carbon of the present invention, a ratio of a pore volume at a pore diameter of 1000 to 10000 nm is preferably 19% or less, more preferably 13% or less, especially preferably 10% or less, in the pore volume at a pore diameter of 10 to 10000 nm measured by the mercury intrusion method. The pore at a pore diameter of 1000 to 10000 nm serves not only as an adsorbed site, but also as a moving path of a substance to a smaller pore. However, when the above ratio is too large, a decrease of a specific surface area, or a decrease of a ratio of a pore which can serve as an adsorbed site can occur more readily. When the above ratio is the above value or less, the desired specific surface area can be obtained more readily and a pore with a pore diameter smaller than 1000 nm which can be serve as an adsorbed site can be formed more readily, and thus, the desired decolorization performance or decolorization arrival rate can be obtained more readily. The lower limit of the above ratio is not especially limited, but is usually 4%.

The specified pore volume mentioned above can be adjusted by adjusting a potassium element content of raw material activated carbon to 0.5% by mass or less, adjusting a calcium element content of raw material activated carbon to 0.4 to 4 by mass or less, and activating the raw material activated carbon after the adjustments, as described later. An activation yield should be appropriately selected so as to obtain the specified pore volume.

In the activated carbon of the present invention, a ratio of a pore volume at a pore diameter of 10 to 30 nm is preferably 30% or more, more preferably 35% or more, especially preferably 45% or more, in a pore volume at a pore diameter of 2 to 30 nm calculated by measuring a nitrogen adsorption isotherm at 77 K and performing the CI method analysis. The pore volume at a pore diameter of 2 to 30 nm is a pore volume of a mesopore, and mainly serves as an adsorbed site of a substance with a large molecular size such as a coloring substance. The ratio of the pore volume of the pores having a pore diameter of 10 to 30 nm in the pore volume of the mesopores is the above value or more, the desired decolorization performance can be obtained more readily. The upper limit of the above ratio is not especially limited, but is usually 70%.

The specified pore volume mentioned above can be adjusted by adjusting a potassium element content of raw material activated carbon to 0.5% by mass or less, adjusting a calcium element content of raw material activated carbon to 0.4 to 4 by mass or less, and activating the raw material activated carbon after the adjustments, as described later. An activation yield should be appropriately selected so as to obtain the specified pore volume.

The activated carbon of the present invention is useful for a liquid phase treatment, since it has the specified pore volumes at the specified pore diameters. Therefore, in one embodiment of the present invention, the activated carbon of the present invention is activated carbon for a liquid phase treatment. In the present invention, the liquid phase may be any liquid phase as long as it exists as a liquid phase under normal processing conditions. Examples of the liquid phase include a solution, a dispersion, an emulsion, a microemulsion, a suspension, an oil and an alcohol.

Examples of the liquid phase treatment include a removal treatment of impurities from a liquid phase and an adjustment of a concentration of a dissolved component in a liquid phase. In one embodiment of the present invention, the above liquid phase treatment is a removal treatment (decolorization treatment) of a coloring component from a liquid phase.

A treatment of a liquid phase having a relatively high viscosity in addition to a treatment of a liquid phase having a low viscosity can be performed by use of the activated carbon of the present invention. In one embodiment of the present invention, a viscosity of a liquid phase measured at a temperature during the liquid phase treatment by use of DV-I+VISCOMETER manufactured by BROOKFIELD (spindle: LV-1, rotational speed: 20 rpm) is 1 to 50 mPa·s.

The liquid phases having such a viscosity may include but are not limited to a sugar liquid, soy sauce and glycerin. The temperature during the liquid phase treatment differs depending on the objective liquid phase. Usually, for example, when the liquid phase is a sugar liquid, the temperature is about 40 to 60° C., when the liquid phase is soy sauce, the temperature is about 15 to 35° C., and the liquid phase is glycerin, the temperature is about 70° C.

A decolorization performance of the activated carbon of the present invention can be evaluated, for example, by use of a sugar liquid or soy sauce by the method described in the Examples mentioned below. The sugar liquid decolorization performance is preferably 20% or more, more preferably 30% or more, especially preferably 40% or more, more especially preferably more than 50%. The soy sauce decolorization performance is preferably 65% or more, more preferably 80% or more, especially preferably more than 90%. These decolorization performances can be obtained by adjusting a balance of the micropore volume and the mesopore volume, concretely by adjusting the MP pore volume to the specified value or less and adjusting the pore volume at the specified pore diameter measured by the mercury intrusion method to the specified value or more.

The activated carbon used for the liquid phase treatment and thus having the decreased adsorption performance (decolorization performance) can be recycled by the predetermined treatment and can be reused.

Method for Producing Activated Carbon

The activated carbon of the present invention can be obtained by a production method comprising:
a step of reducing a potassium element contained in raw material activated carbon (hereinafter, it is also referred to as "a potassium reduction step"),
a step of bringing raw material activated carbon into contact with a calcium element supply source (hereinafter, it is also referred to as "a calcium contact step"),
a step of activating the raw material activated carbon after adjusting a potassium element content and a calcium element content (hereinafter, it is also referred to as "a second activation step"), and
a step of acid-washing the raw material activated carbon after the activation (hereinafter, it is also referred to as "an acid-washing step").

In the present specification, "activated carbon" means activated carbon obtained via the four steps in the above production method, and "raw material activated carbon" means activated carbon obtained by performing an activation treatment (a first activation treatment) of an activated carbon precursor, which is raw material activated carbon for the activated carbon of the present invention and is activated carbon that has not gone through all four of the above steps (that is to say, that is in the middle of the above production process).

The activated carbon of the present invention can be produced, for example, by a production method comprising:
a step of adjusting a potassium element content of raw material activated carbon to 0.5% by mass or less,
a step of adjusting a calcium element content of raw material activated carbon to 0.4 to 4% by mass, and
a step of activating the raw material activated carbon after the adjustment steps.

Therefore, one embodiment of the present invention relates to activated carbon produced by the production method comprising:
a step of adjusting a potassium element content of raw material activated carbon to 0.5% by mass or less,
a step of adjusting a calcium element content of raw material activated carbon to 0.4 to 4% by mass, and
a step of activating the raw material activated carbon after the adjustment steps.

The raw material activated carbon is preferably activated carbon derived from a coal. Therefore, in a preferable embodiment of the present invention, a raw material of the activated carbon of the present invention is activated carbon derived from a coal.

When the raw material activated carbon is derived from a coal, the raw material activated carbon has a detailed surface in comparison with raw material activated carbon derived from a plant such as coconut shell. Therefore, a calcium element-containing component can be placed on the surface of the raw material activated carbon in large amounts, a reaction on the surface of the raw material activated carbon mainly proceeds during the second activation step, and thus, the rate of development of the formed pores is faster than that of the raw material activated carbon derived from the plant, which is advantageous in terms of manufacturing cost.

The coal used as the raw material is not particularly limited, and examples thereof include bituminous coal, lignite, lignite, semi-anthracite, and anthracite. The coals may be used alone or in combination of two or more.

The raw material activated carbon used in the present invention can be obtained, for example, by the activation treatment (the first activation treatment) of the said activated carbon precursor (coal). The activation treatment is a treatment of forming pores on the surface of the activated carbon precursor and modifying the activated carbon precursor to a porous carbonaceous material. This treatment can provide the activated carbon (the raw material activated carbon) having a large specific surface area and a large pore volume. In a case where the first activation treatment is not performed and the activated carbon precursor is used as the raw material activated carbon, the specific surface area and pore volumes of the obtained carbonaceous material are not sufficient. Thus, when such a carbonaceous material is used for the liquid phase treatment, it is difficult to achieve a sufficient effect in the liquid phase treatment such as the removal treatment of impurities from the liquid phase and the adjustment of a concentration of the dissolved component in the liquid phase. Therefore, in such a case, the activated carbon of the present invention cannot be obtained.

The first activation treatment can be performed by treating the activated carbon precursor at 850° C. or more, preferably 850 to 1000° C., under a mixed gas atmosphere of water vapor, nitrogen and carbon dioxide by use of a fluidized bed, a multi-stage furnace or a rotary furnace.

The gas partial pressure at the time is not especially limited, but is preferably a water vapor partial pressure of 7.5 to 40%, a carbon dioxide partial pressure of 10 to 50%, and a nitrogen partial pressure of 30 to 80%. The gas total pressure is usually 1 atm (about 0.1 MPa).

A total supplied amount of the mixed gas during the first activation treatment is around 1 to 50 L/minute relative to 100 g of a material to be activated. When the total supplied amount of the activation gas is within the above range, it is easy to make the activation reaction proceed more efficiently.

The specific surface area of the raw material activated carbon in the present invention which is calculated by the BET method (hereinafter, it is also referred to as "a BET specific surface area") is preferably 900 m$^2$/g to 1500 m$^2$/g. When the BET specific surface area of the raw material activated carbon is within the above range, activated carbon having sufficient physical properties for the liquid phase treatment applications can be obtained more readily.

Potassium Reduction Step

In the production method of the present invention, the potassium element in the raw material activated carbon is reduced to 0.5% by mass or less. The reason is that, when the potassium element exists in large amounts, development of volume of micropores is accelerated ahead of that of volumes of mesopores to macropores suitable for the liquid phase treatment in the second activation step after the contact step of the calcium element supply source.

Therefore, when the potassium element in the raw material activated carbon exceeds 0.5% by mass, the specified pore volumes of the specified pore diameters cannot be obtained in the activated carbon of the present invention. The potassium element content of the raw material activated carbon is preferably 0.3% by mass or less. When the potassium element content is the above value or less, the desired pore volumes can be obtained more readily. The potassium element content can be measured by the method described in the Examples mentioned below. The lower limit of the potassium element content is 0.0% by mass, which is the detection limit of the measuring method.

The method for reducing the potassium element is not particularly limited, and examples thereof include washing with a washing liquid containing an acid, exchanging a potassium component for another component (for example, a calcium component) by an ion-exchanging action, and the like.

Calcium Contact Step

The raw material activated carbon having the potassium element content reduced by the above potassium reduction step is contacted with the calcium element supply source. By this step, the calcium element supply source adheres on the surface of the raw material activated carbon and in the pores of the raw material activated carbon. The calcium element content contained in the raw material activated carbon after the contact step is 0.4 to 4% by mass.

When the calcium element content is not within the above range, the specified pore volumes of the specified pore diameters cannot be obtained in the activated carbon of the present invention even when the following second activation step and acid treatment step are performed. The calcium element content contained in the raw material activated carbon after the contact step is preferably 0.5 to 3% by mass. When the calcium element content is within the above range, the desired pore volumes can be obtained more readily. The calcium element content can be measured by the method described in the Examples mentioned below.

The calcium element supply source is not particularly limited, and a water-insoluble calcium compound or a water-soluble calcium compound can be used as the calcium element supply source. The calcium compounds may be used alone or in combination of two or more.

Examples of the water-insoluble calcium compound include calcium carbonate and calcium hydroxide. From a viewpoint of a handling safety, calcium carbonate is preferably used.

From a viewpoint of being able to contact the calcium element supply source in the form of an aqueous solution and thus easily adhering the calcium element supply source uniformly, the water-soluble calcium compound is preferably used. Concrete examples of the water-soluble calcium compound include calcium chloride, calcium nitrate, calcium acetate and the like. Among them, calcium nitrate is preferable, since it is highly soluble, readily available and inexpensive. From a view point of low environmental impact in view of a waste liquid treatment, calcium chloride or calcium acetate is preferably used.

The method for contacting the calcium element supply source may be any method as long as the calcium element supply source can adhere to the raw material activated carbon. Examples thereof include, for example, a method in which an aqueous solution of the calcium element supply source is sprayed to the raw material activated carbon, a method in which the raw material activated carbon is immersed in a solution of the calcium element supply source, and a method in which the raw material activated carbon and the powdery calcium element supply source are mixed. Among them, the method in which the calcium element supply source in the form of the aqueous solution is contacted with the raw material activated carbon, such as the spraying method or the immersing method, is preferable, since the calcium element supply source can adhere more readily on the surface of the raw material activated carbon and in the pores of the raw material activated carbon uniformly.

In the immersing method which is one of the calcium contact methods, the potassium component in the raw material activated carbon can be exchanged for the calcium component by the ion-exchanging action and discharged into the aqueous solution, and thus, the two steps of the potassium reduction step and the calcium contact step can be simultaneously performed.

When the calcium element supply source is used in the form of an aqueous solution in the calcium contact step, the raw material activated carbon after contacting with the calcium element supply source is usually dried before the second activation step, but may be subjected to the second activation treatment without drying after adequately removing liquid from the raw material activated carbon.

Second Activation Step

The raw material activated carbon after subjecting to the potassium reduction step and the calcium contact step is subjected to the second activation treatment. This second activation treatment is performed in the same manner as in the first activation treatment except that the material to be activated is the activated carbon after adjusting the potassium element content and calcium element content.

Acid-Washing Step

The raw material activated carbon after the second activation step is washed with the washing liquid containing an acid, and thereby impurities such as metal components contained in the raw material activated carbon are removed. The acid-washing can be performed, for example, by immersing the raw material activated carbon after the second activation step in the washing liquid containing an acid. In the acid-washing step, the raw material activated carbon may be washed with water after acid-washing, or the acid-washing and the water-washing may be appropriately combined, for example, by repeating the acid-washing and the water-washing. In addition, the acid component may be removed by heating.

As the acid contained in the washing liquid, inorganic acids such as hydrochloric acid, sulfuric acid and nitric acid, or organic acids such as saturated carboxylic acids such as formic acid, acetic acid, propionic acid, oxalic acid, tartaric acid and citric acid or aromatic carboxylic acids such as benzoic acid and terephthalic acid are preferably used. Among them, hydrochloric acid which does not oxidize the raw material activated carbon is more preferably used. When hydrochloric acid is used as the washing liquid containing an acid, a concentration of hydrochloric acid is preferably 0.1 to 10% by mass, more preferably 0.3 to 6% by mass. When the concentration of hydrochloric acid is too low, it is necessary to increase the number of times of acid-washing to remove the impurities. In contrast, when the concentration of hydrochloric acid is too high, residual amount of hydrochloric acid becomes high. Thus, when the concentration is within the above range, the acid-washing step can be efficiently performed, which is preferable in view of productivity.

The liquid temperature during the acid-washing step or water-washing step is not particularly limited, but is preferably 0 to 100° C., more preferably 10 to 100° C., further preferably 15 to 95° C. When the temperature of the washing liquid during immersing the raw material activated carbon in the washing liquid is within the above range, it is preferable since washing can be performed in a practical time while suppressing a load on the apparatus.

The activated carbon of the present invention can be obtained by drying the activated carbon after the acid-washing step. The method for drying is not particularly limited, and any well-known method for drying may be used. The drying may be performed by use of a natural convection constant-temperature dryer, a forced convection constant-temperature dryer, a vibration fluidized dryer or the like. The drying temperature is preferably 80 to 150° C. A weight loss of the activated carbon after drying is preferably 5% by mass or less.

The activated carbon of the present invention produced in this way has the specified developed pore volumes of the pores including mesopores to macropores. Therefore, the activated carbon of the present invention can exhibit the high performances (such as the removal performance of impurities, and the performance for adjusting a concentration of a dissolved component) in the liquid phase treatment, and, in particular, the improved and balanced decolorization performance in a liquid phase having a relatively high viscosity, such as a sugar liquid, in addition to a liquid phase having a low viscosity.

EXAMPLES

Hereinafter, the present invention will be explained in more detail by the Examples. However, the Examples are not intended to limit the scope of the present invention.

A BET specific surface area and a metal element content of the raw material activated carbon, and a pore volume of the activated carbon were determined by the following methods.

BET Specific Surface Area of Raw Material Activated Carbon

A BET specific surface area of the raw material activated carbon was determined by the high precision surface area/pore distribution measurement device ("BELSORP 28 SA" manufactured by MicrotracBEL Corporation). After degassing the measurement sample at 300° C. for 5 hours under vacuum, a nitrogen adsorption isotherm at 77K was measured. Using the obtained adsorption isotherm, a multipoint analysis by the BET equation was performed. A specific surface area was calculated from a straight line in the range of a relative pressure P/P0 of 0.01 to 0.1 of the obtained curve.

Average Particle Diameter

When a metal element content of the raw material activated carbon and a decolorization performance of the activated carbon are evaluated, the raw material activated carbon or the activated carbon needs to be ground to have a predetermined average particle diameter. Therefore, an average particle diameter of the raw material activated carbon or the activated carbon after grinding was measured by the laser diffraction measurement method in order to confirm whether the raw material activated carbon or the activated carbon has the predetermined average particle diameter.

Specifically, the powdery raw material activated carbon or the powdery activated carbon to be measured, the surfactant and ion-exchanged water were mixed to obtain a dispersion, and the average particle diameter in the dispersion was measured by the penetration method by use of the laser scattering • laser diffraction/scattering particle diameter distribution analyzer ("MT3000II" manufactured by Microtrac-BEL Corporation). A concentration of the powdery activated carbon in the dispersion was adjusted so as to be within the measurement concentration range of the analyzer. Polyoxyethylene (10) octylphenyl ether manufactured by Wako Pure Chemical Corporation was used as the surfactant during preparing the dispersion, and the surfactant was added in an appropriate amount that did not generate bubbles affecting the measurement. The analysis conditions are shown below.

Number of measurements: once
Measurement time: 30 seconds
Indication of distribution: volume
Particle diameter classification: standard
Calculation mode: MT3000II
Solvent name: WATER
Upper limit of measurement: 2000 μm
Lower limit of measurement: 0.021 μm
Residue ratio: 0.00
Passing material ratio: 0.00
Set of residue ratio: disablement
Permeability of particle: permeance
Refraction index of particle: 1.81
Shape of particle: non-spherical
Refraction index of solvent: 1.333
DV value: 0.0150 to 0.0700
Permeability rate (TR): 0.700 to 0.950

The D50 value was adopted as the average particle diameter in the measurement result.

Metal Element Content of Raw Material Activated Carbon

First, calibration curves relating to a potassium element content and a calcium element content were prepared by use of the standard solution with known concentrations.

Next, after the raw material activated carbon ground so as to have an average particle diameter of 20 μm or less was dried at 115±5° C. for 3 hours, 0.1 g of the raw material activated carbon was added to the specified container. To this container, 10 mL of nitric acid (60.0 to 62.0% by mass) was further added, and then, a pretreatment was performed at a temperature of 210° C. for 1 hour by use of the microwave sample pretreatment device ("MARS 6" manufactured by CEN Japan corporation) to decompose the raw material activated carbon.

The obtained solution was taken off, and ion-exchanged water was added to the obtained solution to prepare 200 mL of a measurement solution. The measurement solution was analyzed by use of the multi-type ICP emission analyzer ("ICPE-9820" manufactured by Shimadzu Corporation). A concentration of each of the metal elements was determined by use of the obtained values and the prepared calibration curves, and a potassium element content and a calcium element content were obtained by use of the following mathematical formula.

[Mathematical formula 1]

Metal element content [% by Mass] =

$$\frac{\text{Metal element concentration[mg/L]} \times 10^{-3} \times 0.2\,[\text{L}]}{\text{Mass of raw material activated carbon[g]}} \times 100$$

Pore Volume of Activated Carbon

A pore volume per mass of the activated carbon according to the mercury intrusion method was measured by use of the mercury intrusion method pore volume measurement device ("MicroActive AutoPore V 9600" manufactured by Micromeritics instrument corporation). A mercury pressure of 0.10 psia (about 0.69 kPa) to 61000.00 psia (about 420580.19 kPa) was adopted.

In addition, a pore volume according to the nitrogen adsorption method was measured by use of the high precision surface area/pore distribution measurement device ("BELSORP 28 SA" manufactured by MicrotracBEL Corporation). Concretely, after degassing the measurement sample at 300° C. for 5 hours under vacuum, a nitrogen adsorption isotherm at 77K was measured, and using the obtained adsorption isotherm, each of the pore volumes was calculated by the all kinds of the analysis methods (the MP method analysis and the CI method analysis).

Example 1

(1) Preparation of Raw Material Activated Carbon

Bituminous coal having a weak caking property and a button index of 1 measured according to the crucible expansion test method of JIS M 8801 6 was grounded by use of a ball mill. The obtained ground product was filled into a container with a diameter of 4 cm and a length of 15 cm by use of a pressure molding machine, and pressure molding was performed at 100° C. under a pressure of 280 kg/cm². The obtained pressure molded product was crushed with a jaw crusher and sized in a particle diameter of 0.5 to 2.0 mm. This sized product was put in an external heating type rotary kiln, and heated to 300° C. under an oxidizing gas atmosphere, and the temperature was maintained for 2 hours. Then, the obtained product was heated to 650° C. under a reducing gas atmosphere, and cooled to obtain a carbonized product. This carbonized product (75 g) was put in a fluidized furnace, a mixed gas having a water vapor partial pressure of 16%, a carbon dioxide partial pressure of 12% and a nitrogen partial pressure of 72% was supplied at a gas total pressure of 1 atm and a flow rate of 21.7 L/minute to the furnace, activation was performed under a condition of an activation temperature of 950° C., and the obtained product was sized by use of a 10 to 30 mesh sieve (JIS standard) to obtain raw material activated carbon having a specific surface area of 1390 m²/g.

(2) Preparation of Activated Carbon

The obtained raw material activated carbon (500 g) was immersed in an aqueous solution of calcium nitrate (55.1 g of calcium nitrate tetrahydrate, 1125 g of ion-exchanged water), stirring was performed at a room temperature for 6 hours, filtering was performed, and then, drying was performed in a natural convection constant-temperature dryer set at 115±5° C. for 5 to 7 hours. The potassium element content and the calcium element content of the obtained activated carbon to which calcium was attached were 0.0% by mass and 1.4% by mass, respectively. The raw material activated carbon after adjusting the potassium element content and the calcium element content (450 g) was put in a fluidized furnace, a mixed gas having a water vapor partial pressure of 16%, a carbon dioxide partial pressure of 12% and a nitrogen partial pressure of 72% was supplied to the fluidized furnace at a gas total pressure of 1 atm and a flow rate of 108.4 L/minute, and activation was performed under a condition of an activation temperature of 920° C. so as to obtain an activation yield of 41.7%. A packing density of the obtained activated product was measured according to JIS K1474, 1800 mL of hydrochloric acid (1 N) was added to 410 mL (in terms of volume) of the activated product, and the activated product was washed with heating for 1 hour, sufficiently washed with ion-exchanged water so as to obtain a pH of 5 to 7, and dried at 115±5° C. for 4 hours to obtain activated carbon. The physical properties of the obtained activated carbon are shown in Table 1.

Example 2

Activated carbon was obtained in the same manner as in Example 1 except that an activation yield was 58.0%. The physical properties of the obtained activated carbon were shown in Table 1.

Example 3

Activated carbon was obtained in the same manner as in Example 1 except that an activation yield was 83.0%. The physical properties of the obtained activated carbon were shown in Table 1.

Example 4

Raw material activated carbon (500 g) obtained in the same manner as in Example 1 was immersed in an aqueous solution of calcium chloride (26.9 g of calcium chloride, 1125 g of ion-exchanged water), stirring was performed at a room temperature for 6 hours, filtering was performed, and then, drying was performed in a natural convection constant-temperature dryer set at 115±5° C. for 5 to 7 hours. The potassium element content and calcium element content of the obtained activated carbon to which calcium was attached were 0.1% by mass and 1.2% by mass, respectively. Activated carbon was obtained in the same manner as in Example 1 except that this activated carbon after adjusting the potassium element content and calcium element content was used so as to obtain an activation yield of 44.1%. The physical properties of the obtained activated carbon were shown in Table 1.

Example 5

Activated carbon was obtained in the same manner as in Example 4 except that an activation yield was 59.1%. The physical properties of the obtained activated carbon were shown in Table 1.

Comparative Example 1

Bituminous coal having a weak caking property and a button index of 1 measured according to the crucible expansion test method of JIS M 8801 6 and bituminous coal having a slightly caking property and a button index of 0.5 were mixed in a mass ratio of 3:7. Next, to 100 parts by mass of this obtained mixture, 20 parts by mass of a strongly caking coal having a button index of 9 was added, and mixing and grinding were performed by use of a ball mill. The obtained ground product was filled into a container with a diameter of 4 cm and a length of 15 cm by use of a pressure molding machine, and pressure molding was performed at 100° C. under a pressure of 280 kg/cm². The obtained pressure molded product was crushed with a jaw crusher and sized in a particle diameter of 0.1 to 2.0 mm. This sized product was put in an external heating type rotary kiln, and heated to 300° C. under an oxidizing gas atmosphere, and the temperature was maintained for 2 hours. Then, the obtained product was heated to 650° C. under a reducing gas atmosphere, and cooled to obtain a carbonized product. This carbonized product (75 g) was put in a fluidized furnace, a mixed gas having a water vapor partial pressure of 16%, a carbon dioxide partial pressure of 12% and a nitrogen partial pressure of 72% was supplied at a gas total pressure of 1 atm and a flow rate of 21.7 L/minute to the furnace, and activation was performed under a condition of an activation temperature of 950° C. so as to obtain an activation yield of 50.0%. As to the obtained activated product, a measurement of a packing density, acid washing, water washing and drying were performed in the same manner as in Example 1 to obtain activated carbon. The physical properties of the obtained activated carbon were shown in Table 1.

Comparative Example 2

Activated carbon was obtained in the same manner as in Example 1 except that an activation yield was 92.8%. The physical properties of the obtained activated carbon were shown in Table 1.

Comparative Example 3

Activated carbon was obtained in the same manner as in Example 4 except that an activation yield was 78.6%. The physical properties of the obtained activated carbon were shown in Table 1.

Comparative Example 4

Char prepared from coconut shell of the Philippine-grown coconut (a specific surface area: 370 m²/g) was activated at 850° C. by use of propane combustion gas and water vapor (total water vapor partial pressure: 35%) in a rotary kiln, and raw material activated carbon having a specific surface area of 1141 m²/g was obtained.

An aqueous solution of calcium nitrate (23 g of calcium nitrate tetrahydrate, 117 g of ion-exchanged water) was sprayed to the obtained raw material activated carbon (500 g) and drying was performed in a natural convection constant-temperature dryer set at 115±5° C. for 5 to 7 hours. The potassium element content and the calcium element content of the obtained activated carbon containing calcium element were 0.7% by mass and 0.7% by mass, respectively. Activated carbon was obtained in the same manner as in Example 1 except that the obtained activated carbon containing calcium element was used and an activation yield was 36.8%. The physical properties of the obtained activated carbon were shown in Table 1.

In order to evaluate decolorization performances of the activated carbon of Examples and Comparative examples, first, each of the activated carbon was ground so as to obtain an average particle diameter of 5 to 20 μm. Next, a sugar liquid decolorization performance and a soy sauce decolorization performance of each of the activated carbon of Examples and Comparative examples were measured by the procedure mentioned below. These results are shown in Table 1.

Sugar Liquid Decolorization Performance

A raw sugar ("soft brown sugar" manufactured by Mitsui Sugar Co., Ltd.) (350 g) and 300 mL of ion-exchanged water were mixed at a normal temperature to dissolve the raw sugar. Next, a pH of this aqueous solution of the raw sugar was adjusted to 6.5 to 7.5 with an aqueous solution of sodium hydroxide or hydrochloric acid having a concentration of 0.1 mol/L, and it was confirmed by use of the sugar concentration meter ("Pocket sugar concentration meter PAL-2" manufactured by Atago Co., Ltd.) whether the sugar concentration was 50.0% to obtain a raw sugar liquid. In a case where the sugar concentration was not 50.0%, the raw sugar or ion-exchanged water was added to adjust the sugar concentration to 50.0%, and then, the obtained liquid was used as the raw sugar liquid. Subsequently, 300 g of a granulated sugar ("granulated sugar" manufactured by Mitsui Sugar Co., Ltd.) and 300 mL of ion-exchanged water were stirred at a normal temperature to dissolve the granulated sugar. A pH was adjusted and a sugar concentration was confirmed in the same manner as the raw sugar liquid, thereby a purified sugar liquid was obtained.

It was confirmed with a quartz cell (a light path length of 10 mm) by use of the ultraviolet-visible light spectrophotometer ("UV-1800" manufactured by Shimadzu Corporation) whether an absorbance at a wavelength of 420 nm of the raw sugar liquid was 0.75 to 0.78, and the raw sugar liquid was used as a sugar test liquid. Ion-exchanged water was used for zero point correction when the absorbance was measured. In a case where the measured absorbance value was higher than the above specified range (higher than 0.78), the purified sugar liquid was added to adjust the measured absorbance value to the above specified range, and the obtained liquid was used as a sugar test liquid. In contrast, in a case where the measured absorbance value was lower than the above specified range (lower than 0.75), the preparation was performed again by use of a raw sugar with another production lot, and the obtained liquid which had an absorbance falling within the above specified range was used as a sugar test liquid. A viscosity of the sugar test liquid at a temperature during a liquid phase treatment (50° C.) was 7 mPa·s.

A powdery activated carbon to be measured was dried at 115±5° C. for 3 hours, and allowed to cool in a desiccator. After cooling, 0.092 g of the powdery activated carbon was weighed, and put in a 100 mL conical flask with a stopper part. To this flask, 50 mL of the sugar test liquid was added, shaking was performed at a shaking amplitude of 140 times/minute for 1 hour in a water bath set at 50±1° C., filtering was performed with a 5C filter paper, the first 15 mL of the filtrate was discarded, and the subsequent filtrate was used as a sample solution. In addition, the above procedure was performed without any powdery activated carbon, and the obtained filtrate was used as a blank liquid. Absorbance values at wavelengths of 420 nm and 750 nm of each liquid were measured, and a sugar liquid decolorization performance was calculated by use of the following formula. The purified sugar liquid was used for zero point correction when the absorbance values were measured.

[Mathematical formula 2]

Sugar liquid decolorization performance[%] =

$$\left[1 - \frac{(\text{absorbance at 420 nm of sample liquid}) - (\text{absorbance at 750 nm of sample liquid})}{(\text{absorbance at 420 nm of blank liquid}) - (\text{absorbance at 750 nm of blank liquid})}\right] \times 100$$

The sugar liquid decolorization performance was evaluated according to the following criteria.
A: more than 50%
B: 40% or more, 50% or less
C: 30% or more, less than 40%
D: 20% or more, less than 30%
E: less than 20%

Soy Sauce Decolorization Performance Measurement

Soy sauce ("Specially selected whole soybean soy sauce" manufactured by Kikkoman Corporation) was diluted about 10 times with ion-exchanged water to adjust an absorbance at a wavelength of 550 nm to 0.47 to 0.55, and the obtained liquid was used as a soy sauce test liquid. A viscosity of the soy sauce test liquid at a temperature during a liquid phase treatment (25° C.) was 2 mPa·s. For an absorbance measurement, a quartz cell (a light path length of 10 mm) was used, and the ultraviolet-visible light spectrophotometer ("UV-1800" manufactured by Shimadzu Corporation) was used. Ion-exchanged water was used for zero point correction when the absorbance values were measured.

A powdery activated carbon to be measured was dried at 115±5° C. for 3 hours, and allowed to cool in a desiccator. After cooling, 0.20 g of the powdery activated carbon was weighed, and put in a 100 mL conical flask with a stopper part. To this flask, 40 mL of the soy sauce test liquid was added, shaking was performed at a shaking amplitude of 160 times/minute for 15 minutes in a water bath set at 25±1° C., filtering was performed with a 5C filter paper, the first 15 mL of the filtrate was discarded, and the subsequent filtrate was filtered again to use the obtained filtrate as a sample solution. In addition, the above procedure was performed without any powdery activated carbon, and the obtained filtrate was used as a blank liquid. An absorbance at a wavelength of 550 nm of each liquid was measured, and a soy sauce decolorization performance was calculated by use of the following formula. Ion-exchanged water was used for zero point correction when the absorbance values were measured.

[Mathematical formula 3]

Soy sauce decolorization performance $$[\%] = \left[1 - \frac{(\text{absorbance at 550 nm of sample liquid})}{(\text{absorbance at 550 nm of blank liquid})}\right] \times 100$$

The soy sauce decolorization performance was evaluated according to the following criteria.
A: more than 90%
B: 80% or more, 90% or less
C: 65% or more, less than 80%
D: 55% or more, less than 65%
E: less than 55%

TABLE 1

| | Activation yield [%] | MP pore volume [mL/g] | 10-10000 nm pore volume [mL/g] | 10-50 nm pore volume/ 10-10000 nm pore volume [%] | 1000-10000 nm pore volume/ 10-10000 nm pore volume [%] | 10-30 nm pore volume/ 2-30 nm pore volume [%] | Sugar liquid decolorization performance | Soy sauce decolorization performance |
|---|---|---|---|---|---|---|---|---|
| Example 1 | 41.7 | 0.35 | 1.52 | 38.5 | 9.0 | 46.7 | A | A |
| Example 2 | 58.0 | 0.42 | 0.81 | 47.3 | 9.3 | 44.0 | A | A |
| Example 3 | 83.0 | 0.51 | 0.38 | 31.8 | 13.6 | 32.5 | D | C |
| Example 4 | 44.1 | 0.54 | 0.66 | 33.4 | 12.8 | 36.0 | B | B |
| Example 5 | 59.1 | 0.55 | 0.44 | 29.9 | 15.3 | 30.3 | C | C |
| Comparative example 1 | 50.0 | 0.59 | 0.36 | 22.1 | 27.5 | 18.2 | D | E |
| Comparative example 2 | 92.8 | 0.59 | 0.30 | 24.4 | 15.1 | 18.0 | E | E |
| Comparative example 3 | 78.6 | 0.60 | 0.28 | 19.9 | 17.2 | 17.3 | D | E |
| Comparative example 4 | 36.8 | 0.93 | 0.65 | 30.5 | 23.7 | 14.8 | D | E |

As shown in Table 1, in cases where the activated carbon obtained in Examples 1 to 5 was used, high decolorization performances regarding the sugar liquid and soy sauce were exhibited. In contrast, in cases where the activated carbon obtained in Comparative examples 1, 3 and 4 was used, the activated carbon had the sugar liquid decolorization performances substantially causing no problem, but the soy sauce decolorization performances extremely lower than those of Examples which were insufficient. In addition, in a case where the activated carbon obtained in Comparative example 2 was used, the sugar liquid decolorization performance and the soy sauce decolorization performance were extremely lower than those of Examples. When the activated carbon obtained in Comparative example 2 and the activated carbon obtained in Example 3 are compared which were obtained in the same manner except for their activation yields, it is shown that the activated carbon obtained in Example 3 had the sugar liquid decolorization performance and the soy sauce decolorization performance better (higher) than those of the activated carbon obtained in Comparative example 2.

INDUSTRIAL APPLICABILITY

The activated carbon of the present invention is useful for liquid phase treatment applications, since it has the excellent decolorization performances. In addition, it can be preferably used as activated carbon for treating various liquid phases, since it exhibits the better (higher) decolorization performances in a liquid phase having a relatively high viscosity such as the sugar liquid as well as a liquid phase having a low viscosity such as soy sauce. Furthermore, the activated carbon of the present invention can be produced by the simple method of changing a balance of amounts of the two metal elements and performing activation in the production process, which is industrially useful.

The invention claimed is:

1. An activated carbon,
    wherein the activated carbon has a pore volume, which is calculated by measuring a nitrogen adsorption isotherm at 77 K and performing the MP method analysis, of 0.58 mL/g or less, and a pore volume at a pore diameter of 10 to 10000 nm measured by the mercury intrusion method of 0.35 to 1.9 mL/g, and
    wherein a ratio of a pore volume at a pore diameter of 10 to 50 nm of the activated carbon is 28% or more in the pore volume at a pore diameter of 10 to 10000 nm measured by the mercury intrusion method.

2. The activated carbon according to claim 1, wherein a ratio of a pore volume at a pore diameter of 1000 to 10000 nm of the activated carbon is 10% or less in the pore volume at a pore diameter of 10 to 10000 nm measured by the mercury intrusion method.

3. The activated carbon according to claim 1, wherein a ratio of a pore volume at a pore diameter of 1000 to 10000 nm of the activated carbon is 19% or less in the pore volume at a pore diameter of 10 to 10000 nm measured by the mercury intrusion method.

4. The activated carbon according to claim 1, wherein a ratio of a pore volume at a pore diameter of 10 to 30 nm of the activated carbon is 30% or more in a pore volume at a pore diameter of 2 to 30 nm calculated by measuring a nitrogen adsorption isotherm at 77 K and performing the CI method analysis.

5. The activated carbon according to claim 1, wherein a raw material of the activated carbon is activated carbon derived from a coal.

6. The activated carbon according to claim 1, wherein the activated carbon is activated carbon for a liquid phase treatment.

7. The activated carbon according to claim 1, wherein a ratio of a pore volume at a pore diameter of 1000 to 10000 nm of the activated carbon is 13% or less in the pore volume at a pore diameter of 10 to 10000 nm measured by the mercury intrusion method.

8. The activated carbon according to claim 1, wherein the pore volume calculated by measuring the nitrogen adsorption isotherm at 77 K and performing the MP method analysis is 0.54 mL/g or less, and the pore volume at a pore diameter of 10 to 10000 nm measured by the mercury intrusion method is 0.4 to 1.9 mL/g.

9. The activated carbon according to claim 1, wherein the pore volume calculated by measuring the nitrogen adsorption isotherm at 77 K and performing the MP method analysis is 0.42 mL/g or less, and the pore volume at a pore diameter of 10 to 10000 nm measured by the mercury intrusion method is 0.6 to 1.9 mL/g.

10. The activated carbon according to claim 1, wherein the pore volume calculated by measuring the nitrogen adsorption isotherm at 77 K and performing the MP method analysis is 0.42 mL/g or less, and the pore volume at a pore diameter of 10 to 10000 nm measured by the mercury intrusion method is 1.0 to 1.9 mL/g.

11. The activated carbon according to claim 10, wherein a ratio of a pore volume at a pore diameter of 10 to 50 nm of the activated carbon is 35% or more in the pore volume at a pore diameter of 10 to 10000 nm measured by the mercury intrusion method.

12. The activated carbon according to claim 11, wherein a ratio of a pore volume at a pore diameter of 1000 to 10000 nm of the activated carbon is 10% or less in the pore volume at a pore diameter of 10 to 10000 nm measured by the mercury intrusion method.

13. The activated carbon according to claim 1, wherein a ratio of a pore volume at a pore diameter of 10 to 50 nm of the activated carbon is 33% or more in the pore volume at a pore diameter of 10 to 10000 nm measured by the mercury intrusion method.

14. An activated carbon,
    wherein the activated carbon has a pore volume, which is calculated by measuring a nitrogen adsorption isotherm at 77 K and performing the MP method analysis, of 0.58 mL/g or less, and a pore volume at a pore diameter of 10 to 10000 nm measured by the mercury intrusion method of 0.35 to 1.9 mL/g, and
    wherein a ratio of a pore volume at a pore diameter of 10 to 30 nm of the activated carbon is 30% or more in a pore volume at a pore diameter of 2 to 30 nm calculated by measuring a nitrogen adsorption isotherm at 77 K and performing the CI method analysis.

15. An activated carbon,
    wherein the activated carbon has a pore volume, which is calculated by measuring a nitrogen adsorption isotherm at 77 K and performing the MP method analysis, of 0.58 mL/g or less, and a pore volume at a pore diameter of 10 to 10000 nm measured by the mercury intrusion method of 0.35 to 1.9 mL/g, and
    wherein a ratio of a pore volume at a pore diameter of 1000 to 10000 nm of the activated carbon is 13% or less in the pore volume at a pore diameter of 10 to 10000 nm measured by the mercury intrusion method.

16. A method for producing the activated carbon of claim 1, the method comprising:
    (i) a step of adjusting a potassium element content of a raw material activated carbon to 0.5% by mass or less;
    (ii) a step of adjusting a calcium element content of the raw material activated carbon to 0.4 to 4% by mass; and
    (iii) a step of activating the raw material activated carbon after performing the adjusting (i) and (ii).

* * * * *